Patented Mar. 13, 1923.

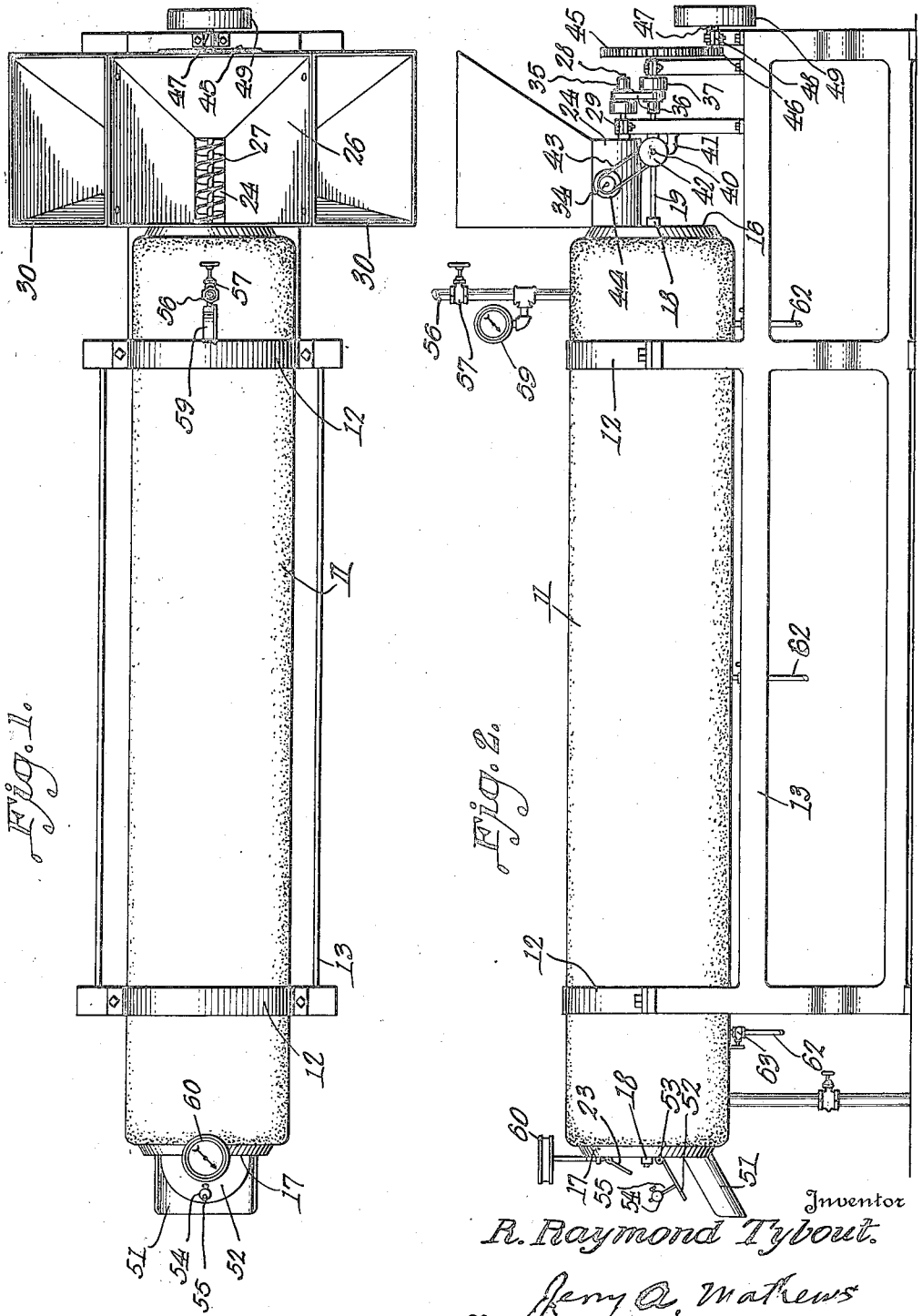

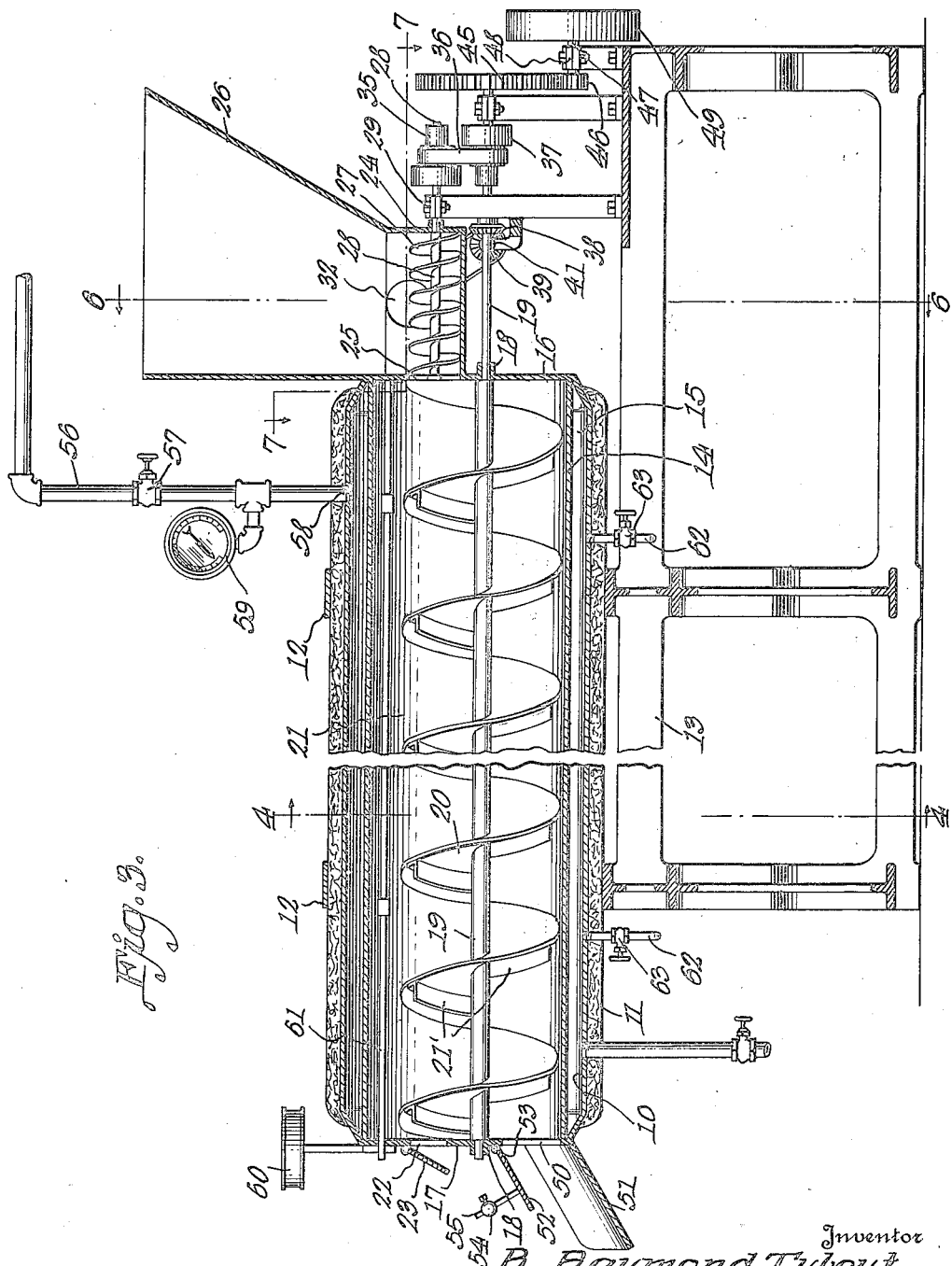

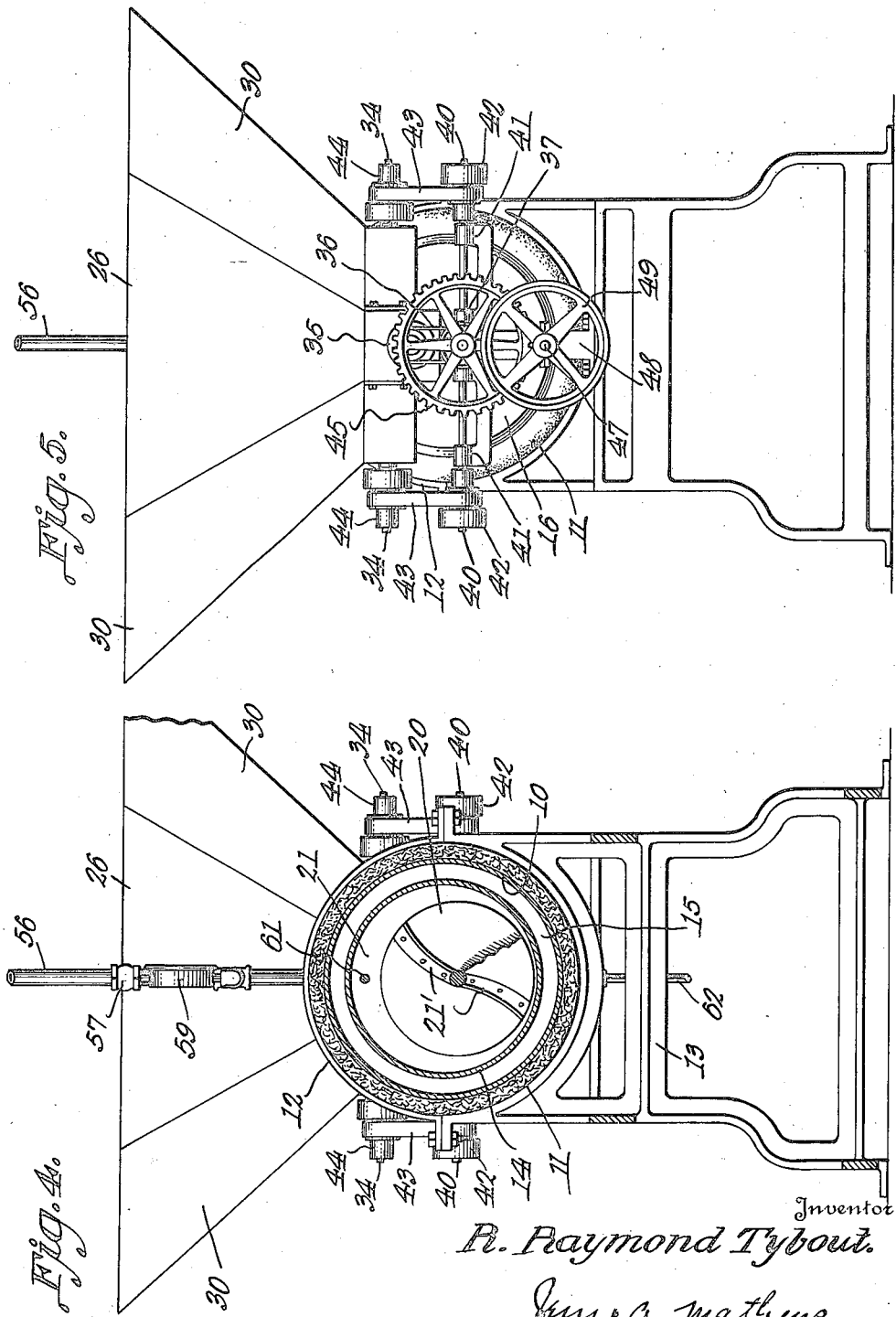

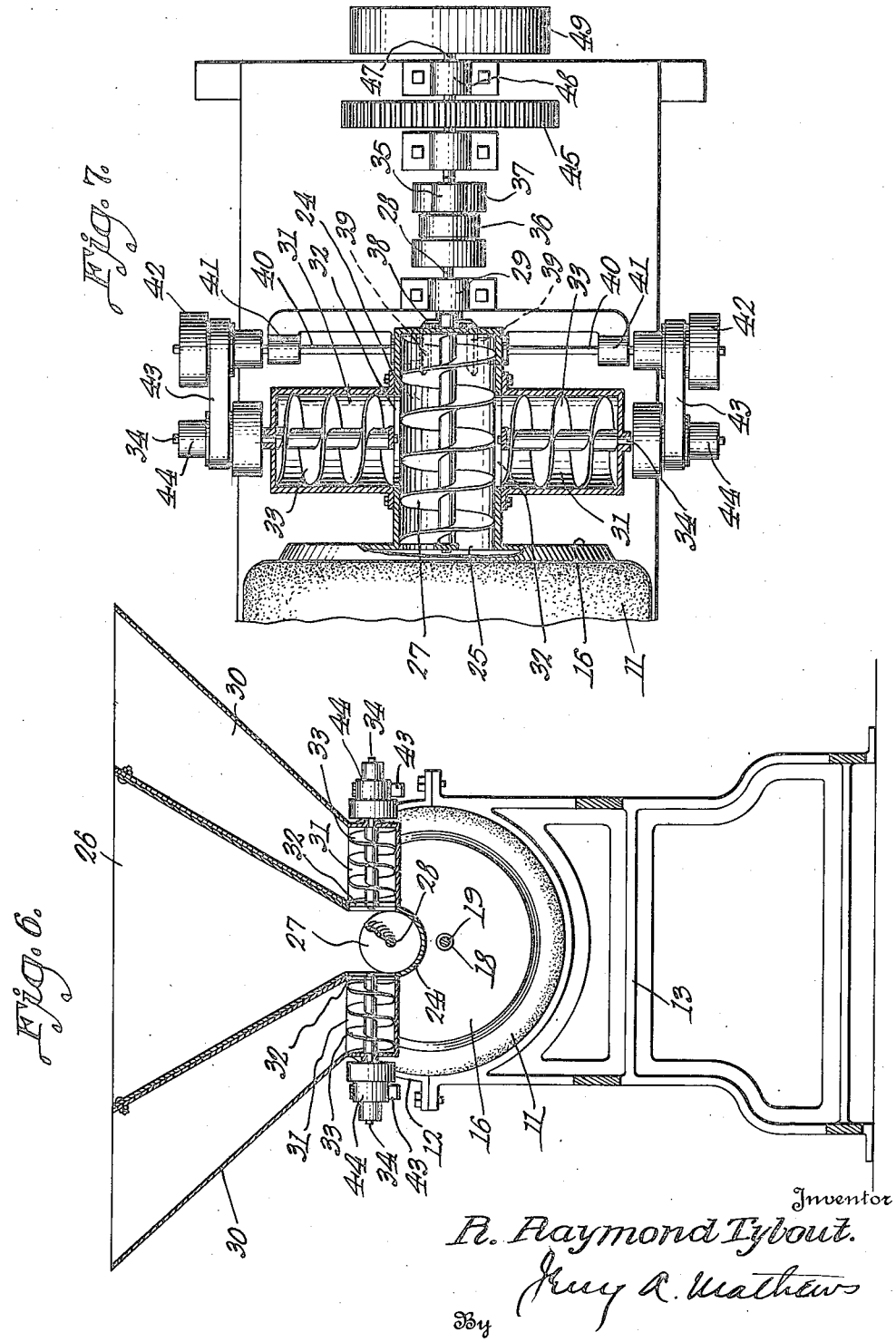

1,448,608

UNITED STATES PATENT OFFICE.

RICHARD RAYMOND TYBOUT, OF PHILADELPHIA, PENNSYLVANIA.

FOOD-MATERIAL HEATER.

Application filed May 26, 1922. Serial No. 563,996.

*To all whom it may concern:*

Be it known that RICHARD RAYMOND TYBOUT, a citizen of the United States, residing at Philadelphia, in the county of Philadelphia and State of Pennsylvania, has invented certain new and useful Improvements in Food-Material Heaters, of which the following is a specification.

My invention relates to apparatus for subjecting material suitable for food, to the action of temperature, hot or cold, in the presence of suitable agitation in the air, to aerate the same.

My apparatus is particularly well adapted for treating flour, grain, or other food materials, by subjecting them to the action of different degrees of heat, in the presence of agitation or aeration, before being baked or cooked. The machine is particularly designed for thus treating flour before it is baked into bread, or for treating the grain, before the grinding or bolting process is completed, in the production of flour.

The object of applying the heat to the flour, grain, or other food material, is to convert a portion of the starch contained therein to dextrin, dextrose, or maltose, and also to aerate the same, and destroy the micro organisms, and increase the water absorbing capacity of the gluten. This action also improves the assimulative and digestive properties of the flour, or food material, and also increases its capacity to absorb water, in order that the bread produced from the flour, may remain moist for a longer period than is obtainable with ordinary flour. This treatment also enables the baker to use flour material with greater economy.

My apparatus also seeks to provide means whereby the user of the same is enabled to utilize two or more food materials, and to accurately blend the same, in such proportions as may be seen most desirable. Illustrations of these food materials may be two or more different grades or varieties of flour, grain, or other food materials.

The apparatus is so constructed that the food material is subjected to the action of heat from steam under pressure, the steam being introduced in a jacket surrounding the cylinder in which the material is held. This enables the heat to be applied in a uniform manner throughout the entire area of the cylinder, and under suitable pressure, whereby the temperature may be accurately adjusted, as indicated by the pyrometer.

My invention also provides novel means for feeding the material through the inner cylinder, such means being in the nature of a spiral conveyer, having means to thoroughly agitate the material, while propelling it longitudinally. The conveyer is arranged beneath the center of the cylinder providing an air space above the conveyer, for aeration.

Other objects and advantages of the invention will be apparent during the course of the following description.

In the accompanying drawings forming a part of this specification and in which like numerals are employed to designate like parts throughout the same, Fig. 1 is a plan view of apparatus embodying my invention, Fig. 2 is a side elevation of the same, Fig. 3 is a central vertical longitudinal section through the machine, Fig. 4 is a transverse section taken on line 4—4 of Fig. 3, Fig. 5 is a front end elevation of the machine, Fig. 6 is a transverse section taken on line 6—6 of Fig. 3, and, Fig. 7 is a plan view of the forward end of the machine, parts being shown in section, taken on line 7—7 of Fig. 3.

In the drawings, wherein for the purpose of illustration is shown a preferred embodiment of my invention, the numeral 10 designates an outer casing or jacket, which is preferably cylindrical, and preferably horizontally arranged. This jacket is preferably surrounded by a coating or casing 11 of heat insulating material, such as asbestos, or the like. The casing or jacket 10, is supported in rings 12, carried by the upper portions of a frame 13, of any well known or preferred construction. Disposed within the jacket 10 and arranged in spaced concentric relation thereto, is an inner preferably cylindrical casing 14, forming with the jacket, a steam space 15. The inner casing 14 is provided at its ends with heads 16 and 17, provided with bearings 18, rotatably receiving the ends of a conveyer shaft 19, as shown. Particular attention is called to the fact that the conveyer shaft 19 is arranged beneath the geometrical center of the inner casing 14, but this shaft is preferably arranged in the central vertical longitudinal plane of the inner casing. The conveyer shaft 19 carries a spiral conveyer 20 rigidly secured thereto; and this spiral conveyer preferably operates in close proximity to the lower portion or the bottom of the casing 14. As more clearly shown in Figure 4, the arrangement of the spiral conveyer 20 is such that a relatively large air space 21 is afforded between the upper portion of the conveyer and the top of the inner casing 14.

The spiral conveyer 20 is provided with pairs of laterally projecting fins or lifting elements 21', the purpose of which is to elevate and agitate the material. It is preferred that the fins in each pair be arranged diametrically opposite each other, so that the conveyer will be properly balanced.

This is of particular importance as it provides means whereby the agitated food material may be properly aerated.

In this connection, it might be pointed out that the head 17 is provided in its upper portion with an opening 22, for the circulation of air, and this opening may be partly or completely covered by an adjustable door 23, as may be desired.

Arranged at the forward end of the inner casing 14 is a mixing chamber 24, in communication with the interior of the casing 14 through an opening 25. This mixing chamber receives food material from an upstanding hopper 26, as shown. The material within the mixing chamber 24 is fed toward and through the opening 25 by means of a spiral conveyer 27, driven by a shaft 28, journaled in a bearing 29. The means for driving the shaft will be described hereinafter.

Arranged upon opposite sides of the main hopper 26 are two supplemental hoppers 30, which lead into chambers 31, at their lower ends. These chambers 31 are in communication with the mixing chamber 24, through the medium of openings 32. The material within the chambers 31 is fed into the chamber 24 through the openings 32 by means of spiral conveyers 33, driven by shafts 34. It is thus seen that three different kinds or grades of flour may be introduced into the several hoppers, and will be fed into the mixing chamber 24, thoroughly mixed, and then fed into the inner casing 14.

It is desired to provide means whereby the spiral conveyers 21 and 33 may rotate at different or selected speeds. To accomplish this, I rigidly mount a stepped pulley 35 upon the shaft 28, and this pulley is adapted to be engaged by a belt 36, engaging a stepped pulley 37, rigidly mounted upon the forward end of the shaft 19, Figure 3. The shaft 19 may be equipped with a beveled gear 38, rigidly secured thereto, driving beveled gears 39, rigidly secured to the inner ends of counter shafts 40, journaled in bearings 41. These counter shafts 40, have stepped pulleys 42 rigidly secured to their outer ends, engaged by belts 43, engaging stepped pulleys 44, rigidly mounted upon the shafts 34. While I have shown and described this particular type of gearing for driving the spiral conveyers, it is to be understood that it is illustrative of a preferred means, but that the invention is in no sense restricted to this particular form of drive, as other means may be advantageously employed.

The shaft 19 is provided at its forward end with a gear 45, engaging a gear 46, rigidly mounted upon a shaft 47, journaled in a bearing 48. A pulley 49 drives the shaft 47, as shown.

At the rear end of the casing 14, is a discharge opening 50, through which the treated food material discharges, the same passing upon an inclined chute 51. The opening 50 is normally covered by a freely swinging door 52, hinged at 53. This door is automatically closed by a weight 54, adjustable upon a rod 55, rigidly secured to the door.

Steam under suitable pressure, is supplied through a pipe 56, having a cut-off valve 57, and leading into the jacket 10, at 58. 59 is a pressure gauge.

The numeral 60 designates a pyrometer, having its tube 61 extending longitudinally within the upper portion of the casing 14. The pyrometer enables the temperature of the material to be accurately ascertained.

Leading into the jacket 10 are drain pipes 62, having cut-off valves 63. Any water formed within the jacket by condensation of the steam, may be withdrawn from the pipes 62.

Assuming that it is desired to mix and blend different kinds of flour, such different kinds of flour would be introduced into the three hoppers. The shaft 19 is continuously rotated, and the spiral conveyers 33 will discharge the two different kinds of flour into the mixing chamber 24, containing the other kind of flour. These three flours would therefore become thoroughly mixed, and the mixed mass discharged into the forward end of the inner casing 14. When within this inner casing, the main conveyer 20 advances the same toward the rear end of the casing 14. In thus advancing the flour, the spiral conveyer 20 and its fins 21' thoroughly agitate the material, lifting it up into the upper air space 21, and dropping the same. This not only thoroughly agitates the material, but aerates the same. The material is thus caused to travel longitudinally through the inner casing 14 and discharge through the opening 50 into the chute 51. While thus traveling through the casing 14 the material is subjected to a temperature from the steam within the jacket, and this temperature may vary from seventy-five degrees to one hundred and seventy degrees C. The temperature will vary widely, depending upon the grade and kind of flour or food material being treated, and may vary beyond these limits. The machine is preferably operated at such a speed that the flour is subjected to this temperature for a period of ten minutes to thirty minutes, depending largely upon the kind and character of the flour, and of course this time may be widely varied.

While my apparatus is particularly well adapted to subject food materials to the action of steam, or heat, yet the invention is not necessarily restricted to this use. It is obvious that material might be chilled within the apparatus, in which case a cooling medium would be circulated through or within the jacket 10. This operation is contemplated, and is within the scope of the invention.

It is to be understood that the form of my invention herewith shown and described is to be taken as a preferred example of the same, and that various changes in the size, shape, form and arrangement of parts may be resorted to without departing from the spirit of my invention or the scope of the subjoined claims.

Having thus described my invention, I claim:

1. In apparatus of the character described, a casing, a jacket surrounding the casing and having no communication with the interior thereof, means for introducing steam into the jacket, a spiral conveyer extending eccentrically with relation thereto, and means for introducing food material into one end of the casing in proximity to the spiral conveyer.

2. In apparatus of the character described, a casing, a jacket surrounding the same, means for introducing steam into the jacket, a spiral conveyer extending longitudinally within the casing and having its center arranged beneath the geometrical center of the casing whereby an air space is provided in the upper portion of said casing, and means for feeding food material into the forward end of the casing.

3. In apparatus of the character described, a casing, a jacket surrounding the same, means for introducing steam into the jacket, a spiral conveyer extending longitudinally within the casing and having its center arranged beneath the geometrical center of the casing, said spiral conveyer being provided with fins which serve to elevate and drop the material, means for feeding food material into one end of the casing, and means whereby such material may be discharged from the other end.

4. In apparatus of the character described, a casing, a jacket surrounding the casing, a spiral conveyer extending longitudinally within the casing with its center beneath the geometrical center of the casing, said spiral conveyer having fins, means for receiving and mixing a plurality of different kinds of food materials and feeding the mixed materials into one end of the casing, and means whereby such material may be discharged from the other end of the casing.

5. In apparatus of the character described, a casing, a steam jacket surrounding the casing, a spiral conveyer extending longitudinally within the casing and having its axis of rotation arranged beneath the geometrical center of the casing for providing an air space in the upper portion of the casing, a mixing chamber leading into one end of the casing, a plurality of hoppers having means of communication with the mixing chamber, a conveyer operating within the mixing chamber, and means whereby material may be discharged from the opposite end of the casing.

6. In apparatus of the character described, a casing, a steam jacket surrounding the casing, a spiral conveyer extending longitudinally within the casing and having agitating means, said spiral conveyor having its axis of rotation beneath the geometrical center of the casing whereby an air space is afforded in the upper portion of the casing, a mixing chamber leading into one end of the casing, a spiral conveyer within the mixing chamber, a hopper mounted upon the mixing chamber, hoppers arranged upon opposite sides of the first named hopper and provided at their lower ends with chambers leading into the mixing chamber, spiral conveyers operating within the chambers of the last named hoppers, means to drive all of the spiral conveyers, and means whereby material may be discharged from the opposite end of the casing.

7. In apparatus of the character described, a casing, a steam jacket surrounding the casing, a main spiral conveyer extending longitudinally within the casing said conveyer having its axis of rotation arranged beneath the geometrical center of the casing for providing an air space in the upper portion of said casing, a mixing chamber leading into one end of the casing, a feed spiral conveyer operating within the mixing chamber, a hopper connected with the mixing chamber, a plurality of hoppers associated with the first named hopper and having chambers leading into the mixing chamber, feed spiral conveyers in the last named chambers, adjustable means for driving each feed spiral conveyer at different speeds, means to drive the main spiral conveyer, and means whereby material may be discharged from the opposite end of the casing.

8. In apparatus of the character described, a casing having a jacket, said casing being provided in one end above its geometrical center with an air opening and below such center with a discharge opening, an adjustable door to cover the air opening, a weighted pivoted door to automatically close the discharge opening, a spiral conveyer extending longitudinally within the casing and having its center arranged beneath the geometrical center of the casing providing an air space between the conveyer and the top of the casing, means to drive the conveyer, and means to feed the material into one end of the casing.

9. In apparatus of the character described, a generally horizontal casing having a steam jacket, a spiral conveyer extending longitudinally within the casing and having its axis of rotation below the geometrical center of said casing for providing an air space in the top of the casing in proximity to the upper portion of the spiral conveyer, fins secured to the spiral conveyor to elevate the material into the air space and drop the same, means for feeding the material to be treated into one end of the casing, means whereby the material may be discharged from the opposite end of the casing, means whereby air may be fed into the air space, and means to drive the spiral conveyer.

In testimony whereof I affix my signature.

RICHARD RAYMOND TYBOUT.